(12) United States Patent
DeLuga et al.

(10) Patent No.: US 7,145,778 B2
(45) Date of Patent: Dec. 5, 2006

(54) SYSTEM AND METHOD FOR MOUNTING A COMPONENT IN A COMPUTER SYSTEM

(75) Inventors: Ronald E. DeLuga, Spring, TX (US); Earl Moore, Cypress, TX (US); Walter J. Rankins, Spring, TX (US); Jeffrey A. Lev, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/964,171

(22) Filed: Oct. 13, 2004

(65) Prior Publication Data

US 2006/0077632 A1     Apr. 13, 2006

(51) Int. Cl.
*H05K 7/00* (2006.01)

(52) U.S. Cl. ............ 361/725; 361/704; 165/80.4; 62/259.2

(58) Field of Classification Search ........ 361/679–687, 361/724–727, 707, 704, 699, 700; 312/223.1–223.6; 165/80.4, 104.33; 62/259.2; 174/15.2; 345/173
See application file for complete search history.

(56) References Cited

U.S. PATENT DOCUMENTS

| | | | |
|---|---|---|---|
| 5,768,099 A | | 6/1998 | Radloff et al. |
| 6,317,317 B1 | | 11/2001 | Lu et al. |
| 6,437,980 B1 | * | 8/2002 | Casebolt ............... 361/687 |
| 6,646,872 B1 | * | 11/2003 | Chen ................... 361/685 |
| 6,933,929 B1 | * | 8/2005 | Novak ................. 345/173 |
| 2002/0085346 A1 | | 7/2002 | Chol |
| 2003/0035268 A1 | * | 2/2003 | Coglitore et al. ....... 361/687 |
| 2004/0105229 A1 | * | 6/2004 | Wang et al. ........... 361/685 |
| 2005/0190535 A1 | * | 9/2005 | Peng et al. ............ 361/685 |

FOREIGN PATENT DOCUMENTS

GB    2293051 A    3/1998

* cited by examiner

Primary Examiner—Huang Van Duong

(57) ABSTRACT

One embodiment is a system for mounting a component in a computer system comprising a bracket having a plurality of access ports that permit the component to be secured to the bracket, and having a plurality of mounting points that permit the bracket to be secured to the computer system; a cavity in the computer system formed to receive the bracket with the component and having a plurality of mounting posts, each of which corresponds with a respective mounting point of the plurality of the mounting points; and a cover that is formed to fit over the cavity and having a plurality of access points, each of which corresponds with a respective mounting point and a respective mounting post, wherein the plurality of access points permits each respective mounting point to be secured to the respective mounting post through the associated access point.

21 Claims, 3 Drawing Sheets

SYSTEM AND METHOD FOR MOUNTING A COMPONENT IN A COMPUTER SYSTEM

FIELD OF THE INVENTION

This application relates in general to a computer, and in specific to a component mounting scheme.

DESCRIPTION OF RELATED ART

Some computer systems have an internally mounted hard drive that cannot be replaced by a consumer-user. Other systems have hard drives that are not permanently mounted in a computer system, enabling a user to replace a hard drive with another hard drive.

Consequently, the mechanism that mounts the hard drive to the computer needs to both minimize shock transmission to the hard drive, and allow a computer user to quickly and easily change the hard drive. Such mounting mechanisms typically function in one of two modes.

In the first mode, the hard drive is rigidly mounted to the frame of the computer. The rigid mount ties the hard drive to the computer such that the hard drive experiences the same movement as the computer, and prevents the hard drive from moving independently from the computer. However, rigid mounts are difficult for a consumer-user to use. If the replacement hard drive is not correctly mounted, then the benefits of the rigid mount are lost, and the replacement hard drive is more likely to experience shock or vibration damage.

One such rigid mounting system uses a slotted connector in the computer that slidably receives the hard drive. One end of the drive is held by the connecter. The other end of the drive is held by two wings that are attached on the drive and are received by two wedge-shaped slots in the computer. The slots exert a compressive force on the wings. A stop screw is then placed into the computer to prevent movement of the drive. The stop screw does not actually attach the drive to the computer, but rather prevents the drive from moving out of the computer.

In the second mode, the hard drive is cushion mounted. The hard drive is surrounded with a cushioning material which dampens shocks or vibrations experienced by the hard drive. Since the hard drive is not directly mounted to the frame, this type of mount is easier for a consumer-user to work with than the rigid mount. Moreover, this type of mount may be useable across various product lines. Since the rigid mount needs to be tied to a frame member, the mounting location and mounting mechanism may be different for different products. Alternatively, with the cushion mount, since no frame member is needed, the location and/or mounting mechanism may be the same across product lines. However, the cushion materials require an additional 4–6 millimeters of space around the hard drive. Space in mobile computers is a limiting factor, and thus more space is required for this type of mount than for the rigid mount.

SUMMARY OF THE INVENTION

One embodiment is a system for mounting a component in a computer system comprising a bracket having a plurality of access ports that permit the component to be secured to the bracket, and having a plurality of mounting points that permit the bracket to be secured to the computer system; a cavity in the computer system formed to receive the bracket with the component and having a plurality of mounting posts, each of which corresponds with a respective mounting point of the plurality of the mounting points; and a cover that is formed to fit over the cavity and having a plurality of access points, each of which corresponds with a respective mounting point and a respective mounting post, wherein the plurality of access points permits each respective mounting point to be secured to the respective mounting post through the associated access point.

DETAILED DESCRIPTION

Figure 1:
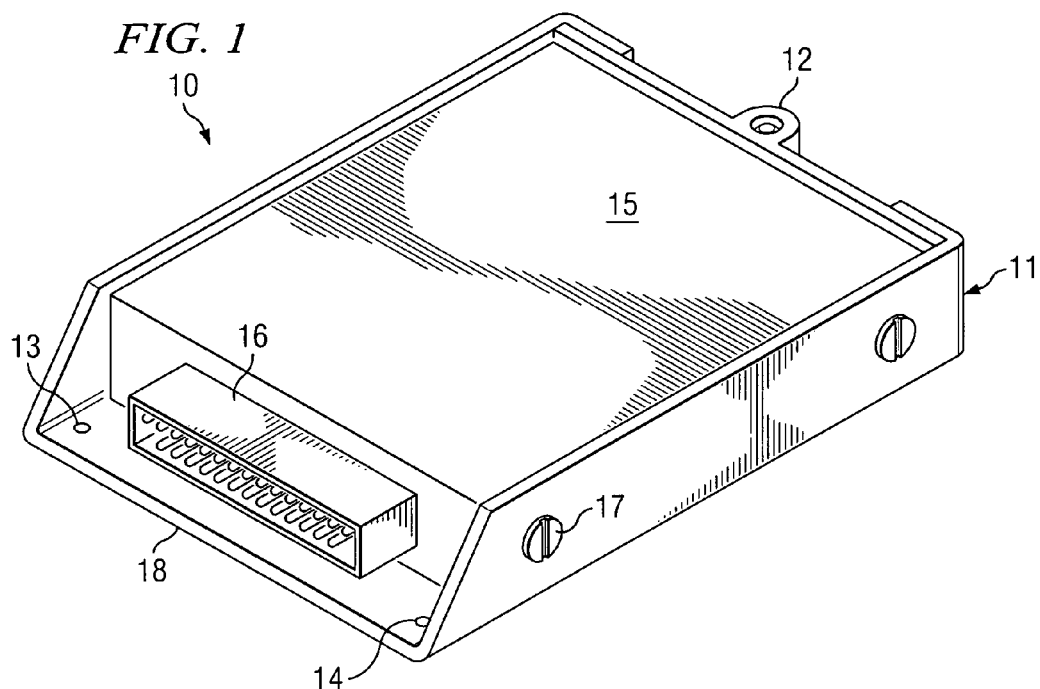
FIG. 1 depicts a perspective view of an arrangement of a bracket supporting a hard drive, according to a representative embodiment.
Figure 3:
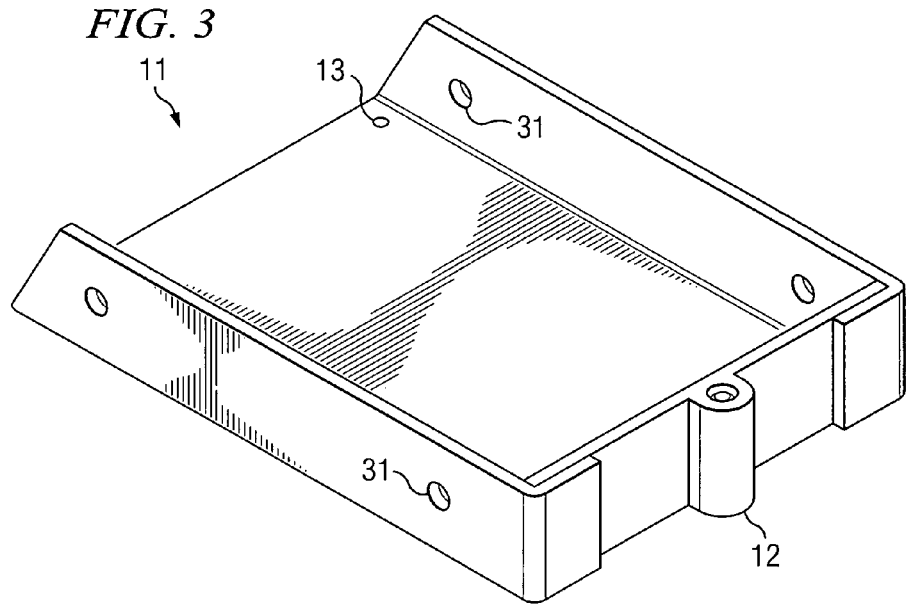
FIG. 3 depicts a perspective view of the bracket of FIG. 1 without the hard drive.

FIG. 1 depicts a perspective view of an arrangement 10 of a bracket 11 supporting hard drive 15, according to a representative embodiment. FIG. 3 depicts a perspective view of the bracket 11 of FIG. 1 without the hard drive. In the arrangement 10 of FIG. 1, the hard drive 15 is mounted into bracket 11 by component fastener 17 via access points (31 of FIG. 3). Bracket 11 provides stiffness and support for the drive 15, which improves the protection of the drive during installation and handling of the drive. The bracket 11 reduces or limits the magnification shocks received by the computer. Ideally, a shock, e.g. a sudden force that is applied to the computer system, is passed through to the hard drive at a one-to-one correspondence. For example, if a 10 g shock is applied to the computer system (e.g. by dropping it), then a 10 g shock would be applied to the hard drive as well. In less than ideal situations, the hard drive mount instead acts a 'rubber band' or 'spring', and magnifies the applied force, thus a 10 g shock may be passed through the hard drive as a 20 g shock, etc. Secondary shocks are caused by the movement of a loosely secured hard drive, where the hard drive moves around (e.g. rattles) when the computer is subjected to a shock. Embodiments of the bracket 11 according to the present invention reduces or limits secondary shocks.

Bracket 11 is a four-sided container that includes a top opening to allow for the hard drive 15 to be located in the bracket. One side of a hard drive 15 is typically more rugged than the other side to allow for handling of the hard drive. Thus, the rugged side of the hard drive is exposed by the top opening of bracket 11. Bracket 11 also includes a side opening to allow for a connector 16 of the hard drive to couple with a corresponding connector of a computer system. Bracket 11 includes a plurality of mounting points, (e.g. mounting point 1 (12), mounting point 2 (13), and mounting point 3 (14) formed to allow for a plurality of fasteners to rigidly connect the bracket 11 (with the hard drive 15) to the frame of a computer. Note that the bracket may include at least one fastener that permits the bracket to be connected with one of the mounting posts via one of the mounting points.

Note that this arrangement 10 has a hard drive 15 by way of example only, as these embodiments may be used to connect other types components to a computer or to other types of systems. Thus other components such as processors, co-processors, power supplies, data storage devices such as optical drives, ZIP drives, solid state memory drives, or other peripheral components may be connected instead of a hard drive. Further, note that number and location of component fasteners 17 is by way of example only, as there may be more/fewer fasteners or the fasteners may be located in different locations. Similarly, the number and location of the mounting points 12, 13, 14 is by way of example only, as there may be more/fewer mounting points or the mounting points may be located in different locations. Still further, note that the fasteners may comprise screws, which provide for a secure connection and allow the user to readily swap out the drive, but may also comprise other types of fasteners such as wing nuts, thumb screws, cam-based fasteners, and/or clip/snap-based fasteners. The bracket 11 may comprise sheet metal, but other materials may be used, e.g. plastics or ceramics.

Figure 2:
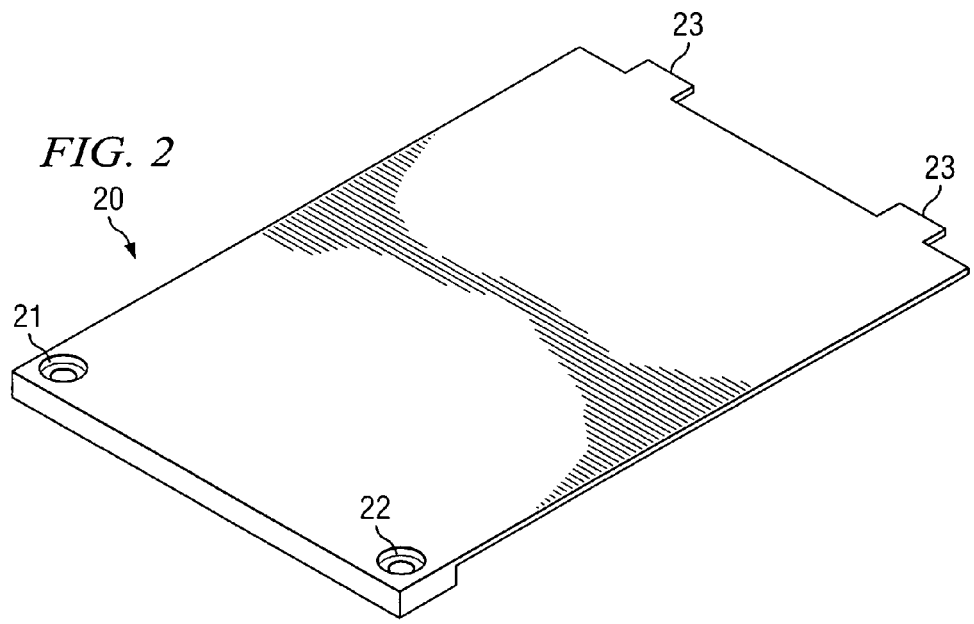
FIG. 2 depicts a perspective view of a cover according to a representative embodiment.

FIG. 2 depicts a perspective view of a cover 20 according to a representative embodiment. The cover 20 is separate from the four-sided bracket 11 of FIG. 1. This provides manufacturing flexibility in that a change in the exterior of the computer will not require changes to the box, e.g. a change in color or styling of the computer casing.

The cover 20 includes access points that correspond with a portion of the mounting points of the bracket 11. For example, this arrangement of cover 20 includes holes 21 and 22 which correspond with mounting points 3 (14) and 2 (13), respectively. The cover 20 also includes at least one retaining mechanism for securing a portion of the cover to the computer casing or frame. For example, this arrangement of cover 20 includes retaining hooks 23, which are designed to fit into corresponding pockets in the computer casing or frame. Note that number and location of access points is by way of example only, as there may be more/fewer access points or the access points may be located in different locations. Similarly, the number and location of the retaining mechanisms is by way of example only, as there may be more/fewer retaining mechanisms or the retaining mechanisms may be located in a different location. Further, note that the retaining mechanisms may also comprise other types of fasteners such as snaps or clips. Still further, note that the cover 20 may include a seal to hermetically seal the hard drive pocket from external air, moisture, dust, water, other contaminates, etc.

Figure 4:
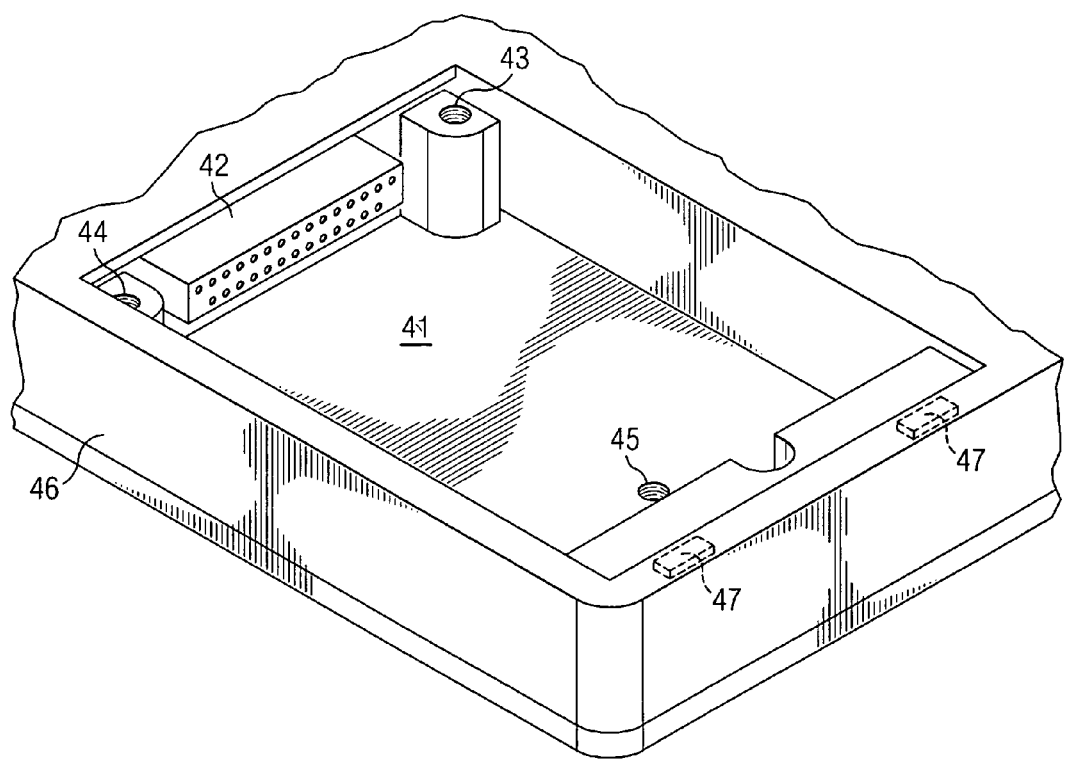
FIG. 4 depicts an example of a hard drive pocket, according to a representative embodiment.

FIG. 4 depicts an example of a hard drive pocket 41 according to a representative embodiment. The pocket may have additional stiffeners or reinforcement to reduce or prevent magnification of vibrations or shocks received by the computer, as well as reduce or prevent secondary shocks or vibrations received by the computer. The pocket is directly attached to the frame of the computer, or may form a portion of the frame of the computer. While pocket 41 is a hard drive pocket in this example, it may be a pocket for some other component, such as processor(s), power supply, etc. in other embodiments.

The hard drive pocket 41 is located on the bottom side of a lap top computer 46 although could be located elsewhere in other embodiments. The pocket 41 is designed to receive the bracket 11 with the hard drive 15. The pocket 41 includes a connector 42 that couples to the connector 16 of the hard drive 15. Note that additional connectors may be present, as needed for the component. The pocket 41 also includes a plurality of mounting posts to correspond with the mounting points of the bracket. For example, the pocket 41 includes mounting posts 43, 44, and 45 which correspond with the mounting points (3) 14, (2) 13, (1) 12, respectively. The pocket 41 also includes retainer(s) 47 that receive a retaining mechanism of a cover. For example, pocket 41 includes cavities 47 which correspond to retaining hooks 23 of cover 20. Note that number and location of mounting posts is by way of example only, as there may be more/fewer mounting posts or the mounting posts may be located in different locations. Similarly, the number and location of the retainers is by way of example only, as there may be more/fewer retainer or the retainers may be located in different locations. Note that one of the mounting posts may not have an associated access point.

Figure 5:
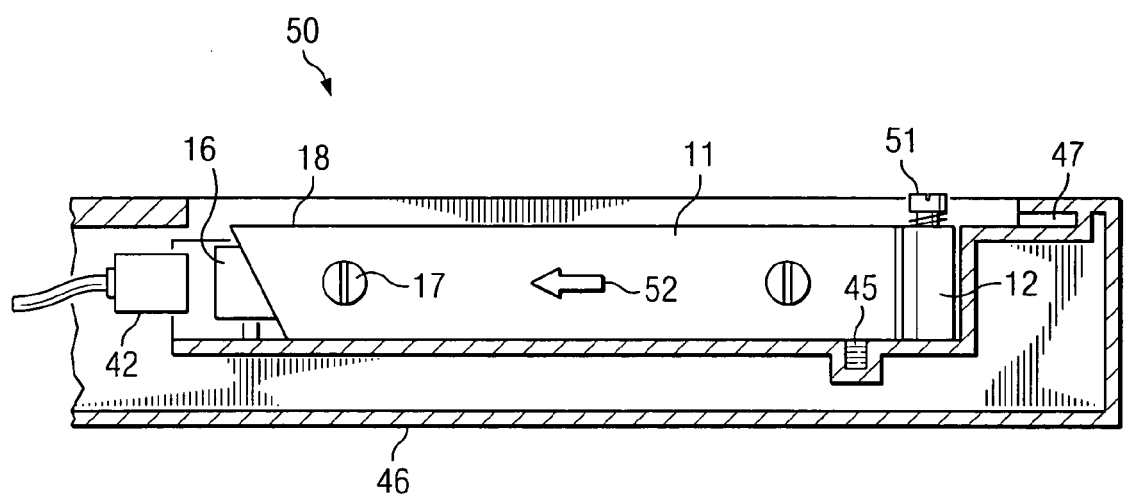
FIG. 5 is a cross-section view of a portion of a computer that depicts the bracket with the hard drive of FIG. 1 placed into the pocket of FIG. 4.

FIG. 5 is a cross-section view of a portion 50 of a computer 46 that depicts the bracket 11 with hard drive 15 placed into the pocket 41. Note that in this view, the computer is in the upside down position. The view of FIG. 5 shows the bracket 11 after placement in the pocket 41 and prior to securing the bracket to the computer 46. Also, the cover 20 is not in place in the view of FIG. 5. Note that the bracket is placed into the pocket such that the side 18 of the bracket is located in the top of the view.

To be begin securing the hard drive and bracket within computer 46, the hard drive/bracket is moved forward in the direction indicated by arrow 52. This causes the connector 16 of the hard drive to couple with the connector 42 of the pocket. This also aligns mounting points 1 (12), 2 (13), and 3 (14) of the bracket 11 with the mounting posts 45, 44, and 43, respectively. In this example, mounting point 1 (12) includes an attached, spring-loaded screw 51. The attached nature of the screw prevents the screw from falling out and/or becoming lost from the bracket. The spring-loaded nature of the screw makes installation and removal of the hard drive easier. After sliding the hard drive forward and coupling the connectors 16, 42, the user would tighten the screw 51 to secure the hard drive to the computer 46.

Figure 6:
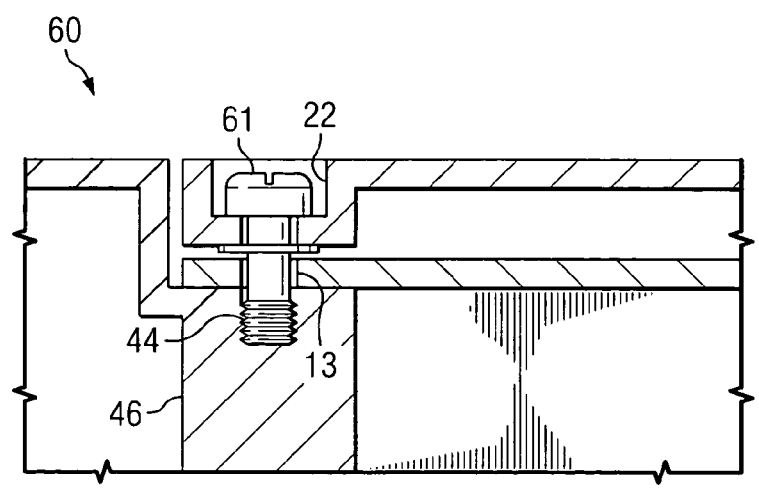
FIG. 6 is a cross-section view of a portion of a computer that depicts the cover of FIG. 2 covering the pocket of FIG. 4 and enclosing the bracket with the hard drive of FIG. 1.

FIG. 6 is a cross-section view of a portion of a computer that depicts the cover 20 of FIG. 2 covering the pocket 41 of FIG. 4 and enclosing the bracket 11 with hard drive 15 of FIG. 1. The view of FIG. 6 shows the bracket 11 after placement in the pocket 41, after installation of the cover 20, and after securing the bracket to the computer 46.

After the coupling of the connecters 16, 42, which also respectively aligns mounting points 1 (12), 2 (13), and 3 (14) with the mounting posts 45, 44, and 43, and securing the bracket to the computer via mounting point 1, the cover would be installed by sliding the hooks 23 of the cover into their respective cavities 47 in the computer. This causes alignment of the holes 21 and 22 with mounting points 3 (14) and 2 (13), respectively (where the mounting points 3 and 2 are already aligned with mounting posts 43 and 44, respectively). The user would then secure the cover to the bracket and to the computer via securing units, e.g. screws. For example, screw 61 is fastened to mounting post 44 of the computer through hole 22 of the cover and mounting point 13 of the bracket. Similarly, another screw (not shown) is fastened to mounting post 43 of the computer through hole 21 of the cover and mounting point 14 of the bracket.

What is claimed is:

1. A system for mounting a component in a computer system comprising:
   a bracket having a plurality of access ports that permit the component to be secured to the bracket, and having a plurality of mounting points that permit the bracket to be secured to the computer system;

a cavity in the computer system formed to receive the bracket with the component and having a plurality of mounting posts, wherein at least one mounting post corresponds wit a mounting point; and a cover that is formed to fit over the cavity and having a plurality of access points, wherein at least one access point corresponds with a mounting point and a mounting post, wherein the at least one access point permits the mounting point to be secured to the mounting post through the at least access point, and wherein the plurality of access points is fewer than the plurality of mounting posts.

2. The system of claim 1, wherein the bracket includes at least one fastener that permits the bracket to be connected with one mounting post of the plurality of mounting posts via one mounting point of the plurality of mounting points.

3. The system of claim 1, wherein the bracket comprises a four-sided box, with first side and a second side each having a subset of the plurality of access ports, a third side that has at least one mounting point of the plurality of mounting points, and a fourth side that has at least two mounting points of the plurality of mounting points.

4. The system of claim 1, wherein the bracket supports the component during installation of the component into the computer system.

5. The system of claim 1, wherein the computer system has been subjected to a physical shock and the bracket inhibits a magnification of the shock as the shock is being transferred to the component.

6. The system of claim 1, wherein the computer system has been subjected to a physical shock and the bracket inhibits a secondary shock from being applied to the component.

7. The system of claim 1, wherein the cover comprises at least one hook that is located at a distant end of the cover with respect to at least one of the access points, and the computer system comprises a least one hook-receiving cavity that is located proximate with said cavity and is formed to receive that at least one hook.

8. The system of claim 1, further comprising:
a first fastener for securing a first mounting point to a first mounting post through a first access point; and
a second fastener for securing a second mounting point to a second mounting post through a second access point.

9. The system of claim 1, further comprising:
a plurality of fasteners for connecting the component to the bracket through the plurality of access ports.

10. The system of claim 1, wherein the component is a hard drive.

11. The system of claim 1, wherein the computer system is a portable computer.

12. The system of claim 1, wherein the plurality of mounting points is three, the plurality of mounting posts is three, and the plurality of access points is two.

13. The system of claim 1, wherein the plurality of mounting points is three, the plurality of mounting posts is three.

14. The system of claim 1, wherein the plurality of mounting points is three, and the plurality of access points is two.

15. The system of claim 1, wherein the plurality of access ports is four.

16. The system of claim 2, wherein the one fastener is an attached spring screw.

17. The system of claim 2, wherein the one mounting post does not have an associated access point.

18. A method of installing a component into a computer system comprising:
attaching the component to a bracket;
placing the bracket with the component into a pocket of the computer system;
moving the component so as to couple a connector of the component wit a connector of the computer system, thereby respectively aligning a plurality of mounting points of the bracket with a plurality of mounting posts of the computer system;
securing one mounting point of the bracket to one mounting post of the computer system with a fastener;
placing a cover over the bracket in the pocket and respectively aligning at least one hole of the cover with another mounting post of the computer system; and
securing another mounting point of the bracket to another mounting post of the computer system with another fastener through at least one hole.

19. The method of claim 18, wherein the placing the cover comprises:
inserting at least one hook of the cover into a respective at least one cavity of the computer system.

20. The method of claim 18, wherein installing the component comprising installing a hard drive.

21. The method of claim 18, wherein installing the component into a computer system comprises installing the component into a portable computer.

* * * * *

UNITED STATES PATENT AND TRADEMARK OFFICE
CERTIFICATE OF CORRECTION

| | | |
|---|---|---|
| PATENT NO. | : 7,145,778 B2 | Page 1 of 1 |
| APPLICATION NO. | : 10/964171 | |
| DATED | : December 5, 2006 | |
| INVENTOR(S) | : Ronald E. DeLuga et al. | |

It is certified that error appears in the above-identified patent and that said Letters Patent is hereby corrected as shown below:

In column 5, line 4, in Claim 1, delete "wit" and insert -- with --, therefor.

In column 5, line 37, in Claim 7, delete "a least" and insert -- at least --, therefor.

In column 6, line 26, in Claim 18, delete "wit" and insert -- with --, therefor.

In column 6, line 37, in Claim 18, after "through" insert -- the --.

Signed and Sealed this

Third Day of February, 2009

JOHN DOLL
*Acting Director of the United States Patent and Trademark Office*